US011204760B2

(12) United States Patent
Stewart

(10) Patent No.: US 11,204,760 B2
(45) Date of Patent: Dec. 21, 2021

(54) ONLINE ACTIVITY MONITORING

(71) Applicant: Share Edge, LLC, La Canada, CA (US)

(72) Inventor: Benjamin C. Stewart, Manhattan Beach, CA (US)

(73) Assignee: Share Edge, LLC, La Canada, CA (US)

( * ) Notice: Subject to any disclaimer, the term of this patent is extended or adjusted under 35 U.S.C. 154(b) by 23 days.

(21) Appl. No.: 16/883,401

(22) Filed: May 26, 2020

(65) Prior Publication Data

US 2021/0263726 A1 Aug. 26, 2021

Related U.S. Application Data

(60) Provisional application No. 62/979,004, filed on Feb. 20, 2020.

(51) Int. Cl.
*G06F 9/54* (2006.01)
*G06F 8/70* (2018.01)
(Continued)

(52) U.S. Cl.
CPC ............... *G06F 8/70* (2013.01); *G06F 9/547* (2013.01); *G06F 16/2379* (2019.01);
(Continued)

(58) Field of Classification Search
None
See application file for complete search history.

(56) References Cited

U.S. PATENT DOCUMENTS 6,167,435 A 12/2000 Druckenmiller
8,407,062 B2 3/2013 Jermyn et al.
(Continued)

FOREIGN PATENT DOCUMENTS

CA 2 785 383 A1 2/2013
JP 2008-192144 8/2008
(Continued)

OTHER PUBLICATIONS

International Search Report; International Application No. PCT/US2013/047702, filed on Jun. 25, 2013 (dated Oct. 14, 2013).
(Continued)

*Primary Examiner* — Craig C Dorais
(74) *Attorney, Agent, or Firm* — Knobbe, Martens, Olson & Bear LLP

(57) ABSTRACT

An incentive management system may receive a request for registration of a software application from a software developer and assign at least an API key and an API secret to the software application. The system may further provide, to the software developer, integration instructions including at least the API key and the API secret and provide a developer platform to the software developer, the developer platform configured to receive program information including at one or more actions that may be performed by a user of the software application. The system may monitor messages from one or more application servers, such as via webhooks embedded in the software application, regarding performance of one or more actions identified as actionable by the software developer. The system may periodically determine a cumulative incentive associated with each of the users of the software application and coordinate provision of the incentives.

10 Claims, 12 Drawing Sheets

FIGURE 1

(51) Int. Cl.
*G06F 16/951* (2019.01)
*G06F 16/955* (2019.01)
*G06F 16/23* (2019.01)
*H04L 29/08* (2006.01)
*G06Q 30/02* (2012.01)
*G06Q 50/00* (2012.01)

(52) U.S. Cl.
CPC .......... *G06F 16/951* (2019.01); *G06F 16/955* (2019.01); *G06Q 30/0214* (2013.01); *G06Q 30/0215* (2013.01); *G06Q 30/0217* (2013.01); *G06Q 50/01* (2013.01); *H04L 67/34* (2013.01)

(56) References Cited

U.S. PATENT DOCUMENTS

| | | |
|---|---|---|
| 8,522,330 B2 | 8/2013 | Shuster et al. |
| 10,475,059 B2 | 11/2019 | Stewart et al. |
| 10,963,903 B1 | 3/2021 | Stewart et al. |
| 2003/0220863 A1 | 11/2003 | Holm et al. |
| 2004/0103426 A1 | 5/2004 | Ludvig et al. |
| 2005/0015482 A1 | 1/2005 | Blankenship |
| 2005/0044139 A1 | 2/2005 | Christian et al. |
| 2006/0026032 A1 | 2/2006 | Higgins et al. |
| 2007/0106608 A1 | 5/2007 | Khandelwal |
| 2007/0121843 A1 | 5/2007 | Atazky et al. |
| 2007/0255702 A1 | 11/2007 | Orme |
| 2008/0071775 A1 | 3/2008 | Gross |
| 2009/0259538 A1 | 10/2009 | Miller et al. |
| 2010/0042487 A1 | 2/2010 | Barazani |
| 2011/0106597 A1 | 5/2011 | Ferdman et al. |
| 2011/0246265 A1 | 10/2011 | Gardenswartz |
| 2011/0320250 A1 | 12/2011 | Gemmell et al. |
| 2012/0150598 A1 | 6/2012 | Griggs |
| 2012/0158477 A1 | 6/2012 | Tennenholtz et al. |
| 2012/0215615 A1 | 8/2012 | Moredock |
| 2012/0221387 A1 | 8/2012 | Liu et al. |
| 2012/0290938 A1 | 11/2012 | Subbarao et al. |
| 2013/0066695 A1 | 3/2013 | Just |
| 2013/0159089 A1 | 6/2013 | Gil et al. |
| 2013/0226710 A1 | 8/2013 | Plut |
| 2013/0231974 A1 | 9/2013 | Harris et al. |
| 2014/0012645 A1 | 1/2014 | Stewart et al. |
| 2014/0012654 A1 | 1/2014 | Stewart et al. |
| 2014/0039990 A1 | 2/2014 | Georgi |
| 2014/0106704 A1 | 4/2014 | Cooke et al. |
| 2015/0112774 A1 | 4/2015 | Georgoff et al. |
| 2017/0154347 A1* | 6/2017 | Bateman ................ G06Q 40/08 |
| 2018/0275966 A1 | 9/2018 | Linton et al. |
| 2019/0102078 A1* | 4/2019 | Bhatt .................. G06F 3/04847 |
| 2019/0347082 A1* | 11/2019 | Gurtin ..................... G06F 9/547 |
| 2020/0111115 A1 | 4/2020 | Stewart et al. |

FOREIGN PATENT DOCUMENTS

| | | |
|---|---|---|
| KR | 10-2004-0072017 | 8/2004 |
| KR | 10-0728937 | 6/2007 |
| WO | WO 02-29605 A2 | 4/2002 |
| WO | WO 2012/125852 A2 | 9/2012 |
| WO | WO 2013/130735 A1 | 9/2013 |

OTHER PUBLICATIONS

International Search Report and Written Opinion; International Application No. PCT/US2021/016355, filed on Feb. 3, 2021 (dated Apr. 5, 2021).

* cited by examiner

Getting Started

To setup Appevater on your platform we first need a little information...

Email Address: [Your email address]
Phone Number: [Your phone number]
App Name:
App URL:
Password:
Retype Password:

☑ I have read and agreed to the Terms of Service

(SUBMIT)

FIG. 2

SETUP

Welcome to Apptivator! Now that we are integrated, please fill in your API information to connect to your account EMAIL: John@business.com

APP ID: 12345

APP KEY: 37f1a25a8b9f4bc8a508fe26bd1a0fd3

APP SECRET: bf443cdc41eb4663bc3c73f2b4eeba8d

FINISH

FIG. 4

| Home>Action>Actions>Add action |
|---|

Add action

Name: [_____]

Action type: [----- ▾ ✎ +]

Program: [----- ▾ ✎ +]

FromUser: [----- ▾ ✎ +]

ToUser: [----- ▾ ✎ +]

Event: [----- ▾ ✎ +]

610

[Save and add another] [Save and continue editing] [SAVE]

Home > Event > Events > Add event

Add event

Start time:
- Date: [ ] Today 📅
- Time: [ ] Now ⊙
- Note: You are 5 hours behind server time.

End time:
- Date: [ ] Today 📅
- Time: [ ] Now ⊙
- Note: You are 5 hours behind server time.

Host: [▼] ✏ +

Program: [▼] ✏ +

Name: [_____]

[Save and add another] [Save and continue editing] [SAVE]

FIG. 6B

Click to edit and view App 1.

Program: Program 1. Click to edit and view this program.
CSS Test Page for 1

Add Program:

Name: ☐

Budget: [0]

CPA: ☐
CPC: ☐
CPM: ☐
IsActive: ☐

[Create Program]

Action Types for App "APP 1": Click to edit

Add an Action Type: ☐

[Submit]

FIG. 7

ONLINE ACTIVITY MONITORING

BACKGROUND

Tracking of event objects, such as associated with behavior or interactions of entities in response to information stored on various publicly accessible databases is a nontrivial task.

SUMMARY

An incentive management system allows an application provider to integrate software code into its software applications that track activities of users, such as via webhooks, to detect particular activities identified by the application provider that are associated with an incentive. For example, an incentive management system may receive a request to provide online service to users of a software application provided by an application provider, receive, from the application provider, selection of one or more activities that may be performed by users of the application, and generate one or more webhooks associated with the selected one or more activities, wherein the webhooks are configured to activate upon performance of one or more of the selected activities in the software application. The one or more webhooks may then be provided to the application provider for inclusion in the software application and the inventive management system monitors messages responsive to activation of the one or more webhooks.

As discussed herein, an incentive management system (or simply "IMS"), provides a rewards service to application providers (e.g., app developers) that drives organic growth, increases user retention and content creation, and targets underutilized features of mobile apps. Application providers are able to decide what they want to reward, and how much they will reward for each action, making it very cost effective since the application provider only pays when the actions they want to be taken is complete. Users will be more incentivized to use applications that reward in cash over competitors that offer no rewards. In some implementations, the IMS charges a fee (e.g., from 1%-10%) of the incentives earned by users of a particular application. For example, the application provider may be invoiced periodically the total of all rewards owed to users+a percentage of those total earned rewards that is payable to the IMS. Once the IMS receives the payment for earned rewards from the application provider, those rewards are paid and/or otherwise made available to the individual users who have earned them. Rewards may be provided in various formats, such as cash rewards (e.g., US dollars), cryptocurrency, incentives, or other rewards.

In some implementations, application providers that are looking to generate new leads from other applications that use the IMS platform (e.g., for an upgrade fee) may promote the new application in those other applications. For example, incentives for testing and/or providing feedback regarding the new application may be provided to users from the other apps.

Example Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

User or Entity: an individual, group of individuals, business, other entity, and/or combination of the aforementioned. For example, a user may be an individual or a group of individuals associated with some device, such as a computing device. For example, the various systems and methods discussed herein often refer to a user that is typically an individual consumer (e.g., a first consumer is John Doe) that operates a particular computing device (e.g., John Doe has an iPhone). In other embodiments, however, users may be groups of persons (e.g., a household of individuals, a married couple, etc.) associated with other computing devices or groups of computing devices (e.g., an entire household of mobile and stationary computing devices).

User Input (also referred to herein simply as "input"): Any type of input provided by a user (or other entity) that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Application Programming Interface (API): A defined communication channel, protocol, settings, and so forth that allows devices to exchange information between one another in a more direct manner than might otherwise be possible, such as via one or more secure network communication channels. In some embodiments, an API registration module may be configured to register individual devices (for example, computing devices, Internet of things devices, sensors, and so forth) for communication with a particular computing device (for example, a central server that receives, processes, stores, provides, information to the individual devices) by issuing a security token (for example, an API token or an API key) to the individual devices that authorizes such direct communications. Thus, a computing system may establish secure and direct communication channels with multiple devices via APIs.

Generally, an API defines a standardized set of operations, inputs, outputs, and underlying types, such that functionality is accessible via the API in an efficient way. Accordingly, the system advantageously abstracts away (from the third party's perspective), much of the complexity that may be involved in the functionality of the system, and enables the third party to quickly and efficiently leverage functionality of the system to build other systems and services. In general, an API call is a request from a first system (e.g., a software application running on a user device) for data from a system (e.g., a distributed server), which is responded to with the requested data if the API call includes the proper authentication information.

Event object: data or other indicator of a particular event performed by an entity. For example, an event object may indicate that an action associated with a particular software application has been performed.

Action (or event): an action that may be performed by a user of a software application. An action may be associated with a webhook embedded in the software application that triggers generation of an event object that may be transmitted to a management system, for example, for use in determining whether an incentive for performance of the action should be provided to the user. Actions may be performed entirely within the related software application (e.g., the software application that is registered with the management system and includes a webhook associated with the action) and/or outside of the related software application (e.g., in another software application or browser, such as in response to redirection from the registered software application). Actions may include, but are not limited to, posting content (e.g., a photo, video, etc.) on a particular social media platform such as a social media platform provided by the software application and/or another related social media platform; providing/posting a comment, sending a message (e.g., text message, email, Tweet, Facebook, etc.), sending a message including particular content (e.g., promoting the software application), using the software application (and/or other software applications) for a particular period of time, during certain time periods, and/or in a particular way, answering questions or comments of others, and/or any other action that might be perceived as increasing value of the software application.

Management System (e.g., an Incentive Management System): a computing system that tracks events of entities and communicates with various systems, such as an application server, to implement an incentive program.

Webhook: Software code, such as executable commands, that cause communications from one application (and/or device) to another application (and/or device), such as over one or more networks. A webhook may more generally refer to any method of augmenting or altering (or adding to) the behavior of a web page or online application with custom callbacks. These callbacks may be maintained, modified, and/or managed by third-party users and developers (e.g., by an incentive management system) who may not necessarily be affiliated with the originating website or software application provider.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. \

BRIEF DESCRIPTION OF THE DRAWINGS

FIG. 2 illustrates an example user interface that a provider may complete to initiate the process of registering with the IMS.

FIG. 4 illustrates one example user interface allowing the provider to begin establishment of an incentive program for a particular application.

FIG. 6A illustrates one example user interface that allows the provider to create a new action.

FIG. 6B is an example user interface that may be provided to the provider to allow entry of event criteria.

FIG. 7 illustrates another example user interface that includes examples of information that may be provided by a provider in establishing an incentive program.

DETAILED DESCRIPTION

An incentive management system allows an application provider to integrate software code into its software applications that track activities of users, such as via webhooks, to detect particular activities identified by the application provider that are associated with an incentive. For example, an incentive management system may receive a request to provide online service to users of a software application provided by an application provider, receive, from the application provider, selection of one or more activities that may be performed by users of the application, and generate one or more webhooks associated with the selected one or more activities, wherein the webhooks are configured to activate upon performance of one or more of the selected activities in the software application. The one or more webhooks may then be provided to the application provider for inclusion in the software application and the inventive management system monitors messages responsive to activation of the one or more webhooks.

Example Incentive Management Implementation

Figure 1:
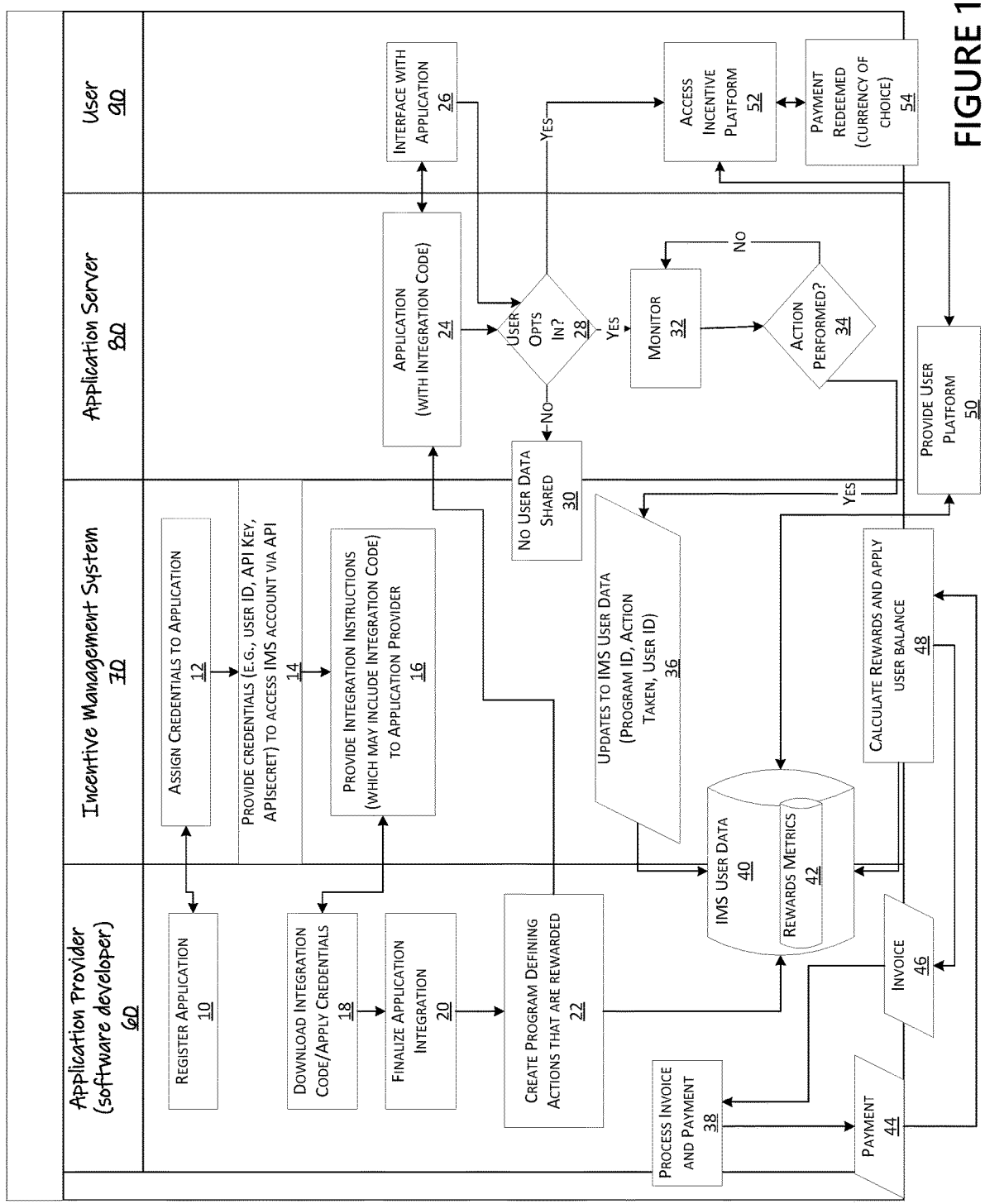
FIG. 1 is a diagram illustrating an example structural and operational configuration of various devices associated with implementation of an incentive management program.

FIG. 1 is a diagram illustrating an example structural and operational configuration of various devices associated with implementation of an incentive management program. In other implementations, fewer or additional entities may be involved and/or the processes performed by the entities may be combined, separated, and/or performed in a different manner.

In this example, the application provider 60 is an entity that provides a software application to a user 90, such as a consumer that downloads software applications on a consumer device, such as a mobile phone or personal computer. For example, the user 90 may download a software application from an application store on the user's mobile phone. The discussion here is largely with reference to "a user" and "an application provider" for ease of description, but the system is configured for operation with a large plurality of users and/or application providers, such as thousands or millions of users, and application providers in the same or similar manner. For example, discussion herein of interactions of the user 90 with a particular software application are applicable to any number of other users that also interact with the same software application.

The application provider 60 (or simply "provider 60") may include an entity that employs software programmers that develop a software application that is downloadable by the user 90 via an application store, for example. The application server 80 is one example of an application store, or could be any other server or location where the user 90 can access the software application from the provider 60. In some embodiments, the application may be provided to the user 90 in other manners, such as through a direct download that does not include an application server 80. The incentive management system ("IMS") 70 is configured to communicate with the application provider 60 to establish an incentive provision account with the application provider 60 and to facilitate provision of incentives to the user 90 (and other users similar to user 90).

Beginning at block 10, the provider 60 registers a software application with the IMS 70. For example, the provider 60 may access a website provided by the IMS 70 that requests information regarding an application for which the provider 60 would like to offer incentives to users. The term "application" is not limited to downloadable software that is executed on the user device, but also includes remote-executing code, such as may be provided through a website, as well as any combination of downloadable and remote-executable code. Thus, an application may include any combination of user device code and server executed code.

FIG. 2, for example, illustrates an example user interface that a provider 60 may complete to initiate the process of registering with the IMS 70. As shown in FIG. 2, the provider 60 is asked for the application name and application location (e.g., URL), along with account credential information that will be used by the provider 60 to access application provider's incentives account subsequently.

Figure 3:
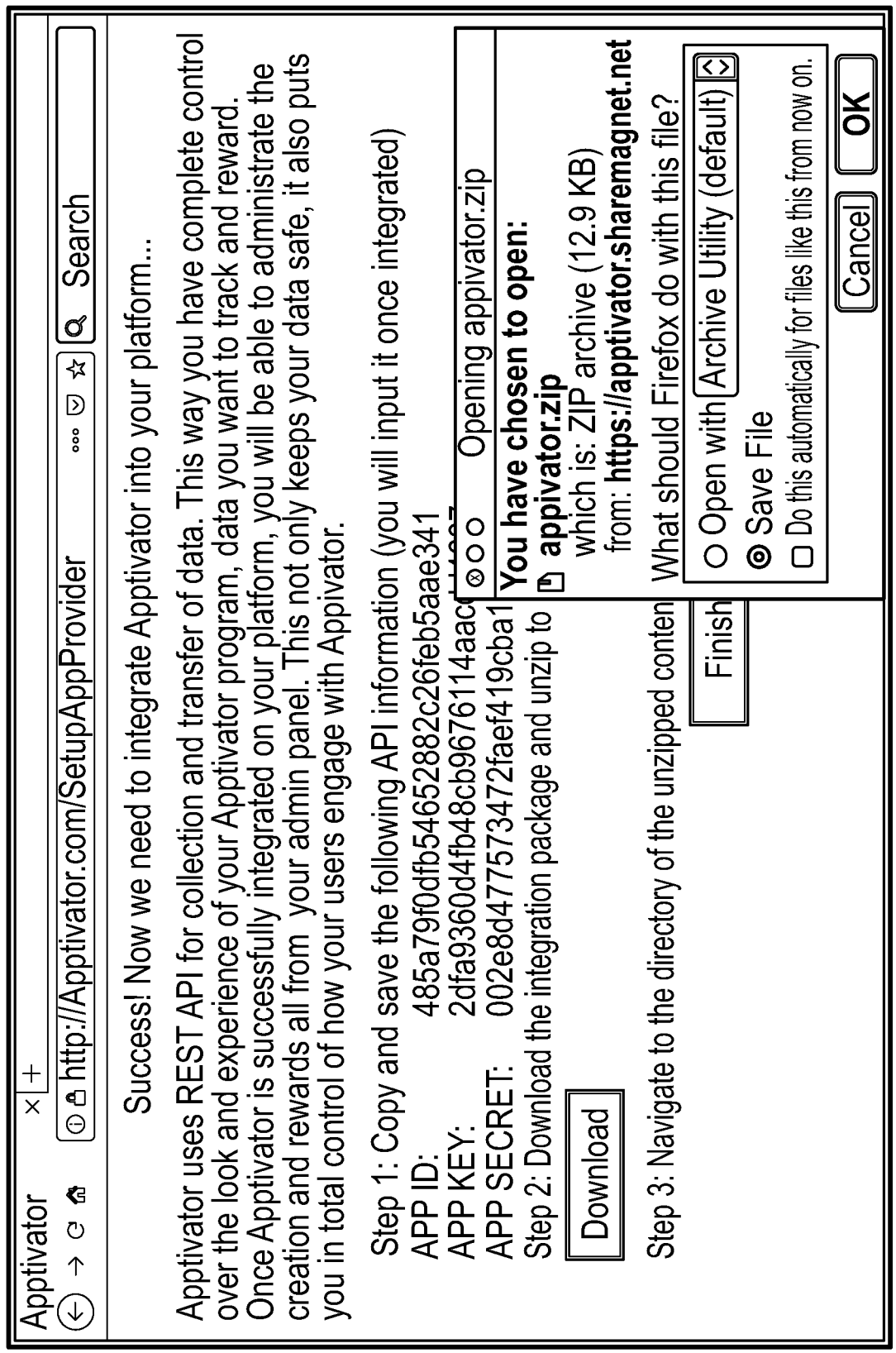
FIG. 3 illustrates one example setup interface that may be provided to the application provider upon establishing an incentive provision account.

At block 12, the IMS 70 receives the registration information from the provider 60 and assigns credentials to the software application identified by the provider 60. At block 14, the IMS 70 then provides the credentials, such as a user ID, API key, API secret, etc. that are usable by the provider 60 to access its incentive provision account via a direct (e.g., API) communication channel with the IMS 70. FIG. 3 illustrates one example setup interface that may be provided to the application provider 60 upon establishing an incentive provision account, such as at block 16 (FIG. 1).

Integration instructions, which may include integration code, are provided to the provider 60. Integration code may include one or more webhooks, such as executable commands that cause communications from one application to another over HTTP, such as in XML, JSON, or other form-encoded serialization. Additionally, a user interface similar to FIG. 3 may be part of such integration instructions.

At block 18, the provider 60 downloads the integration instructions and applies the credentials to the indicated software application. For example, in some implementations the provider 60 may add software code to its software application that allows the software application to interface with the IMS 70 (e.g., via one or more webhooks). Thus, the actual software code of the application provider may be modified and/or updated to include software code, such as webhooks, prior to distribution of the software code to users. In some embodiments, the provider 60 is given the appropriate credentials (e.g., an API key and API secret) and the provider 60 integrates those into its software application. In some embodiments, the IMS 70 provides software code that may be more easily integrated into the software application, such as JavaScript code that includes a webhook using the API key and API secret. In either case, the application integration is completed at block 20, and the provider 60 is ready to create one or more incentive programs defining actions within the modified software application that are rewarded at block 22.

In the example of FIG. 1, the IMS user data 40 is illustrated between the provider 60 and the IMS 70. In this example, the IMS user data 40 is stored by the IMS 70, but accessible by the provider 60. For example, the provider 60 may create an incentive program (e.g., block 22) and store the rewards metrics 42 on the IMS user data 40. The rewards metrics 42 may include, for example, particular actions associated with incentives in the program established by the developer 60.

FIG. 4 illustrates one example user interface allowing the provider 60 to begin establishment of an incentive program for a particular application. In this example, the provider 60 supplies application information including an application identifier, an application key (e.g., an API key), and an application secret (e.g., an API secret).

Figure 5:
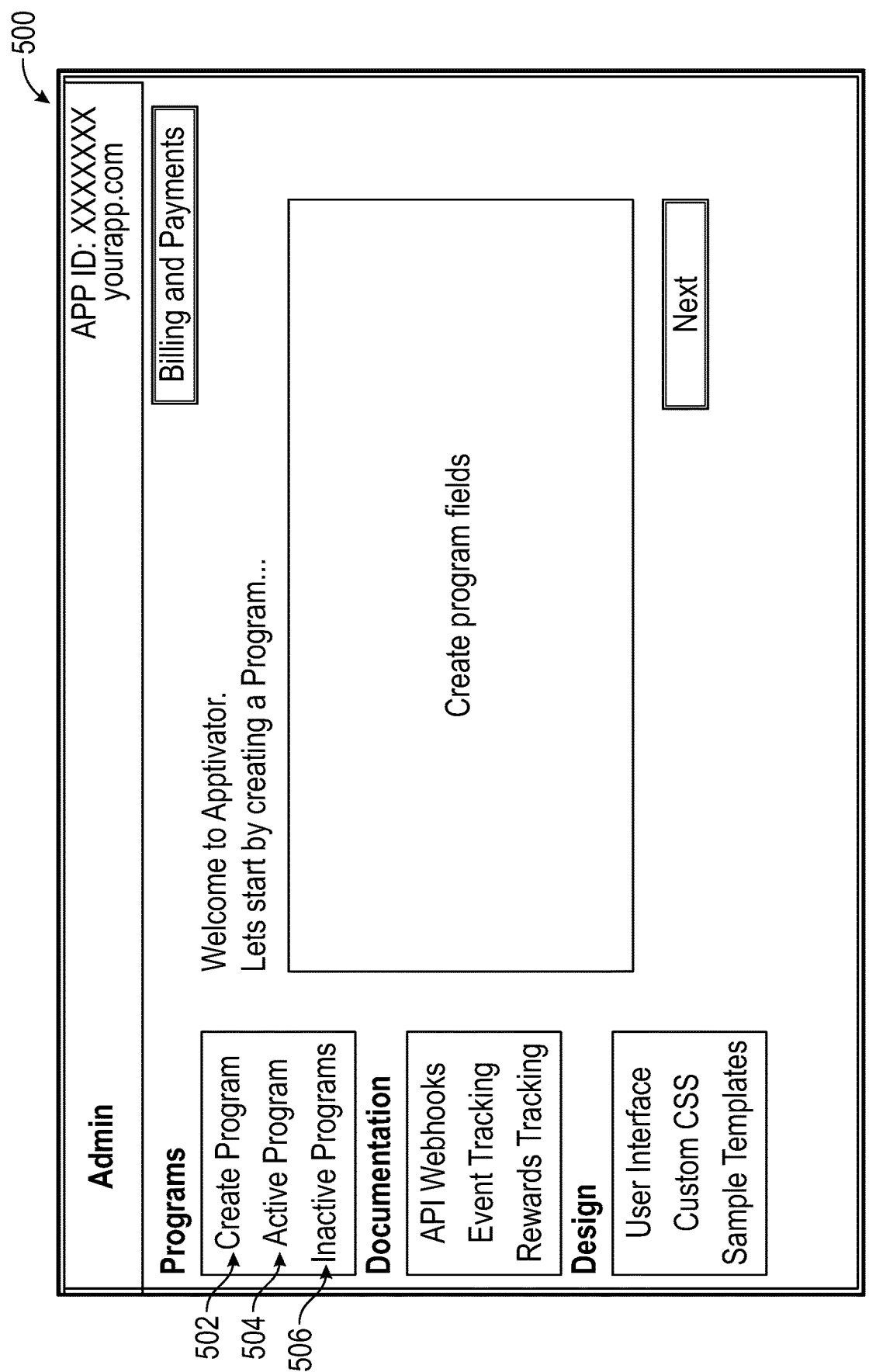
FIG. 5 is an example administrative user interface that may be provided to the application provider to allow establishment of an incentive program for a registered application (e.g., the application indicated in the user interface of FIG. 4).

FIG. 5 is an example administrative user interface 500 that may be provided to the application provider 60 to allow establishment of an incentive program for a registered application (e.g., the application indicated in the user interface of FIG. 4). In this example, the provider 60 is provided options to create a new program 502, view any active programs 504, or view any inactive programs 506. In other implementations, other user interface configurations and options may be provided. If the user selects the new program button 502, the provider 60 may define actions and events that are associated with an incentive, as well as the particular incentive (e.g., cash or) associated with performance of those defined actions.

FIG. 6A illustrates one example user interface 600 that allows the provider 60 to create a new action (that is associated with an incentive payable to the user 90 when the action is performed). In this example, adding an action provides user interface that requests a custom name and criteria associated with the action, such as an action type, program, from-user, to-user, and/or event. Depending on the embodiment, the action type may include an action that can be performed within the software application or an action that is performed in conjunction with, or separate from, the software application. For example, an action may be defined as sending a message from the application to another individual. Another action may be defined as posting content (e.g., a photo or message) on a particular social media platform such as a social media platform provided by the software application and/or another related social media platform. For example, a user may link to another social media platform from the software provider 60 application in order to obtain an incentive for posting content.

FIG. 6B is an example user interface 650 that may be provided to the provider 60 to allow entry of event criteria. In some implementations, an action may include an event criteria (e.g., event 610 of FIG. 6A). For actions that include event criteria, the event criteria may include one or more of a start time, end time, host, program, and/or custom event name, such as is shown in the example of FIG. 6B. FIG. 7 illustrates another example user interface 700 that includes examples of information that may be provided by a provider 60 in establishing an incentive program. In this example, the provider 60 may indicate a budget, CPA, CPC, CPM, and the like, that may be associated with actions.

Figure 8:
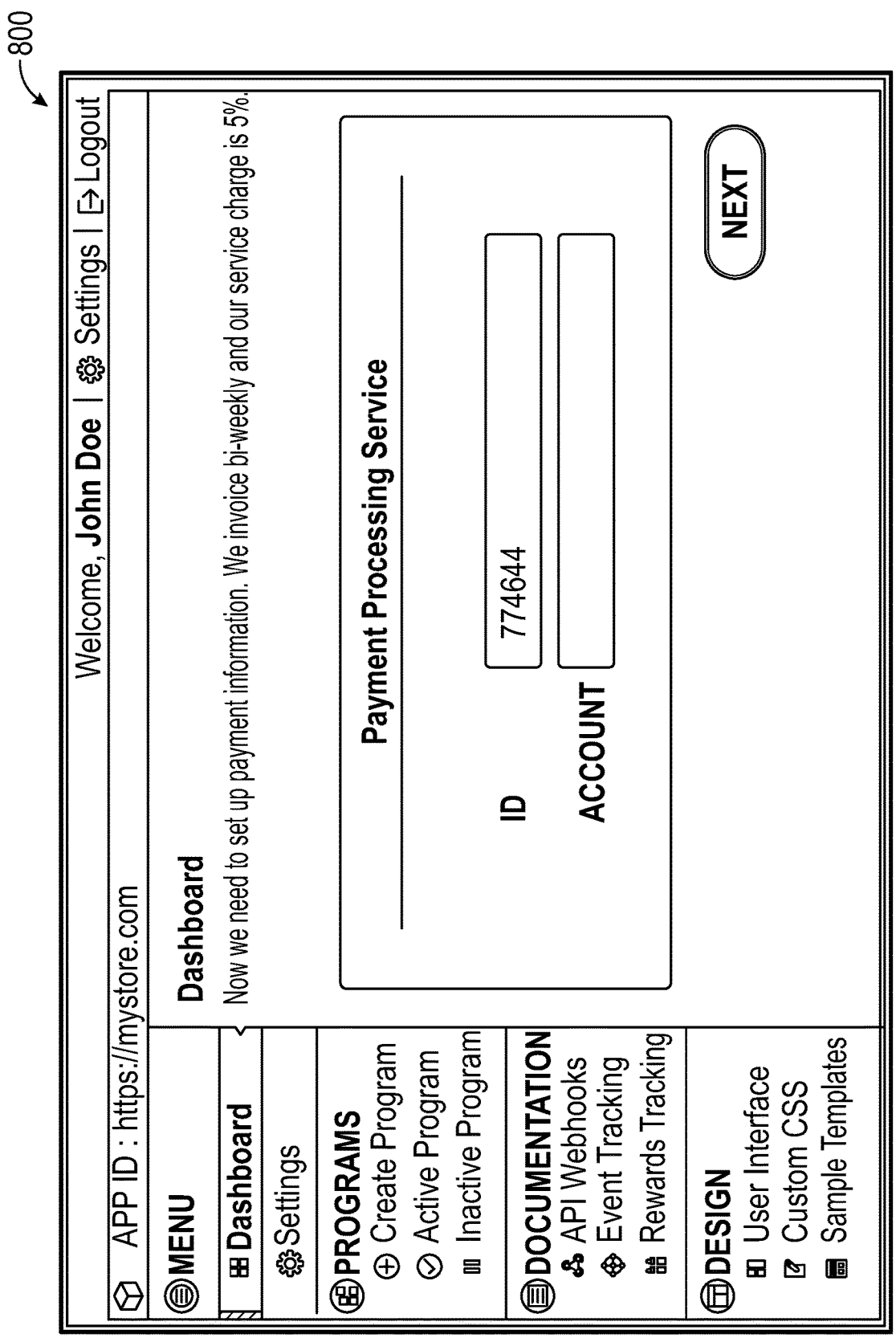
FIG. 8 illustrates an example a user interface that allows the provider to authorize payments to the IMS via a payment processing service, such as a credit card processor or automated clearinghouse (ACH) or other debit processing service.

As part of the account set up (e.g., block 10 of FIG. 1) and/or program set up (e.g., block 22), in some implementations the application provider 60 provides payment account information from which the IMS 70 receives payment in exchange for the incentive management services provided to the application provider 60. FIG. 8 illustrates, for example, a user interface 800 that allows the provider 60 to authorize payments to the IMS 70 via a payment processing service, such as a credit card processor or automated clearinghouse (ACH) or other debit processing service. In other embodiments, any other payment account type or configuration may be used.

Returning to FIG. 1, with the program defined (block 22), the software application, including the integration code (e.g., one or more web hooks associated with actions included in the program) is provided to the application server 80 for access and/or distribution to the user 90.

At block 26, the user 90 interfaces with the application provided by the application server 80, such as by downloading and installing the application on a smart phone. In some implementations, the user is provided an opportunity to opt into the incentive program that has been established by the provider 60. FIGS. 9A-9D illustrates examples of user interfaces that may be provided to the user 90 in setting up a user incentive account at block 52. In some implementations, such user interfaces may be provided as part of the software application from the provider 60, such that the user 90 may not be aware that the IMS 70 is involved in coordinating the incentive program. In some embodiments, user interfaces such as those in FIG. 9A-9D may be provided via a separate software application or browser accessible content, such as an application that is separately downloadable by the user 90.

Figure 9B:
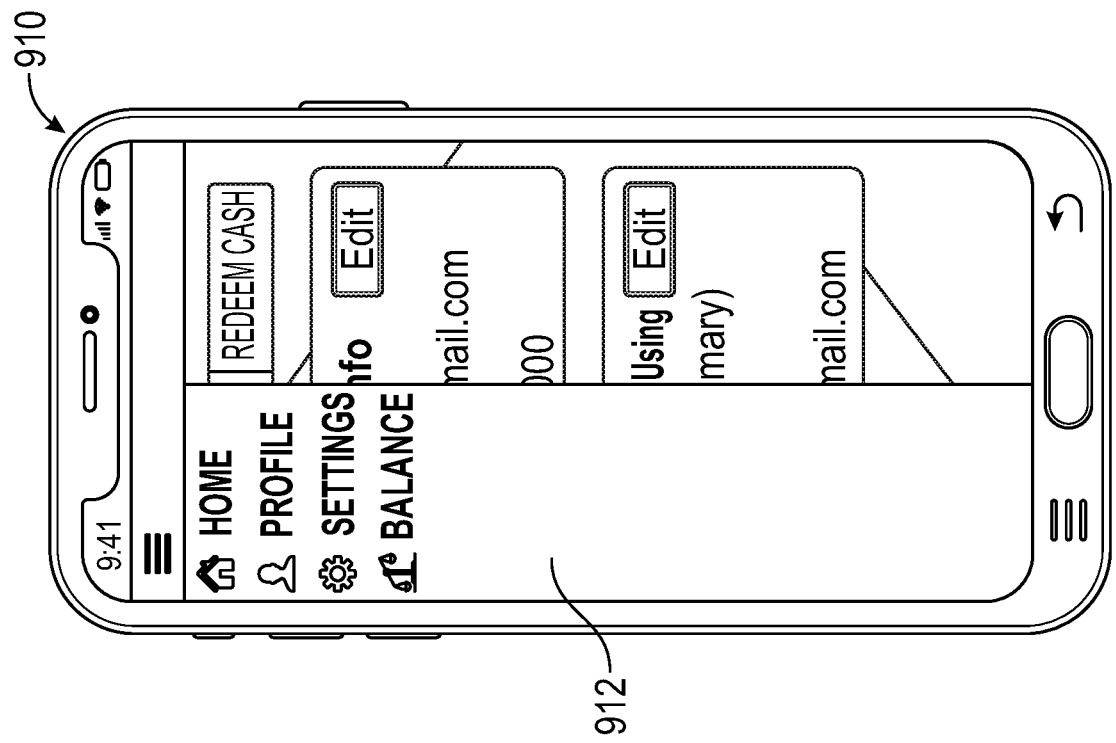
FIGS. 9A-9D illustrates examples of user interfaces that may be provided to the user in setting up a user incentive account.
Figure 9A:
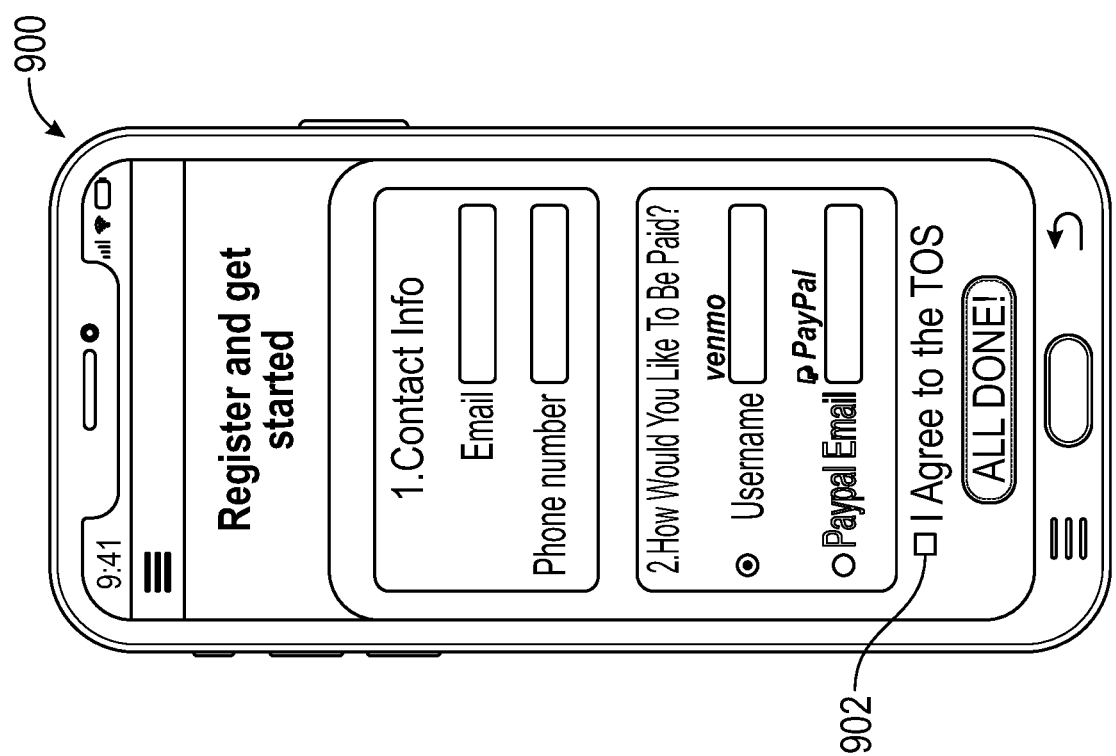

Beginning with FIG. 9A, the example user interface 900 allows the user 90 to opt into the incentive program (e.g., by selecting the "I agree to the TOS (terms of service)" checkbox 902 at the bottom of the user interface. As shown in this example, various options for payment of incentives may be available to the user 90, including options for payment via fiat currency (e.g., US dollars), digital currency (e.g., bitcoin or other blockchain based currency), and/or any other incentive, reward, and/or payment form.

Next, FIG. 9B illustrates an example user interface 910 that includes a menu 912 having an option for Home, Profile, Settings, and Balance. In other implementations, fewer or additional options may be provided in the application.

Figure 9D:
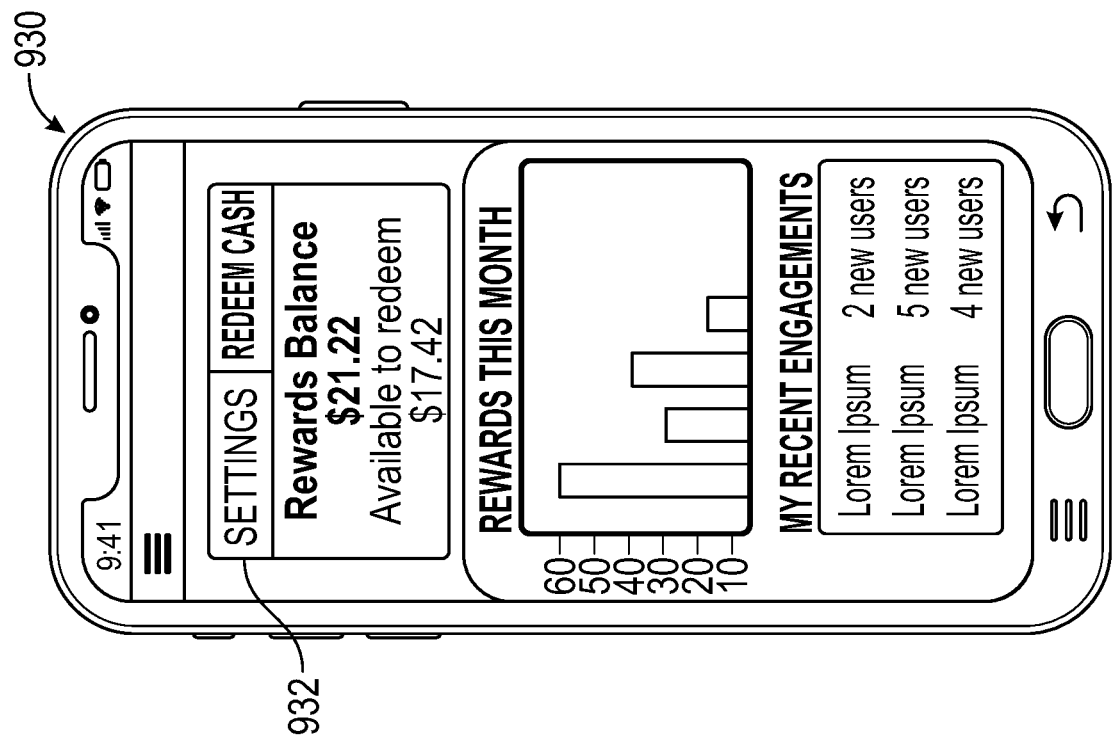
Figure 9C:
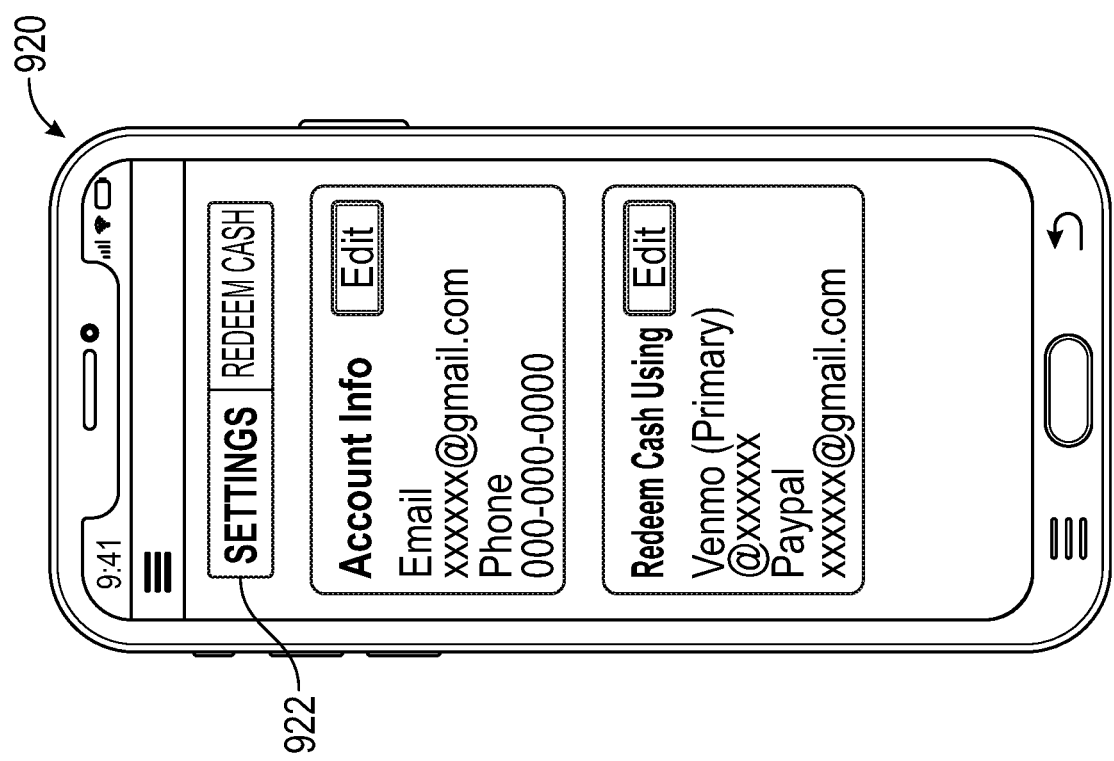

FIG. 9C is an example user interface 920 depicting a settings panel 922, which in this example indicates account information of the user and payment information of the user, along with options to update or edit those options.

FIG. 9D is an example user interface 930 depicting a redemption panel 932, which allows the user 90 to view incentives that are available for payment to the user and to initiate transfer of the incentives to the indicated payment account of the user. In the example of FIG. 9D, the example user has a rewards balance of $21.22, with $17.42 available to redeem. In some implementations, rewards become redeemable when payment for the rewards is received by the IMS 70 from the provider 60. With reference to FIG. 1, for example, the IMS 70 may periodically (e.g., weekly, monthly, etc.) calculate rewards payable to users of the registered software application and transmit an invoice 46 to the application provider 60. The application provider 60 may then process the invoice and payment at block 38 and transmit payment 44 back to the IMS 70. This invoicing and payment process may be entirely automated and performed in a real-time manner, or may be performed in any other manner. Once the payment 44 is confirmed by the IMS 70, the incentives associated with the payment 44 are updated from an earned status to a payable status (or "available to redeem" in the example of FIG. 9D) within the IMS user data 40. Thus, when the user accesses the IMS user data 40 via the user platform 50, a current balance of earned rewards (e.g., $21.22 in the example of FIG. 9D) and redeemable balance (e.g., $17.42 in the example of FIG. 9D) may be provided. The user may then be provided with an option to initiate redemption of the redeemable balance, such as by clicking a button on the user interface to confirm the incentive redemption request. In the example of FIG. 9D, information regarding historical rewards that have been earned and/or redeemed is also provided.

At block 28, the application server determines whether the user 90 has opted into the incentive program and, if not, does not share any user data with the IMS 70 (block 30). Alternatively, if the user has opted into the incentive program at block 28, the user 90 is provided access to the consumer incentive platform 52 (discussed further below), and the application server 80 begins monitoring 32 usage of the application by the user 90, such as to detect when actions included in the program are performed, which may be detected by receiving callbacks from web books embedded in the software application used by the user 90.

At block 34, while no actions included in the active program (or programs) are identified, the application server 80 continues to monitor at block 32. When an action of an active program is identified at block 34, the application server 80 transmits an update 36 to the IMS user data 40, such as information indicating a program identifier, action taken, user ID, and/or other information associated with the detected action. The updates 36 are usable to determine incentives payable to the user 90, as well as payments due to the IMS 70 from the provider 60.

At block 50, the application server 80 provides a user platform 50 that is accessible to the user 90 (e.g., via block 52). The user platform 50 may communicate with the IMS user data 40 and/or the rewards metrics 42 to obtain information regarding incentives payable to the user 90, as well as information regarding actions taken by the user 90 that qualify for incentives.

Figure 10B:
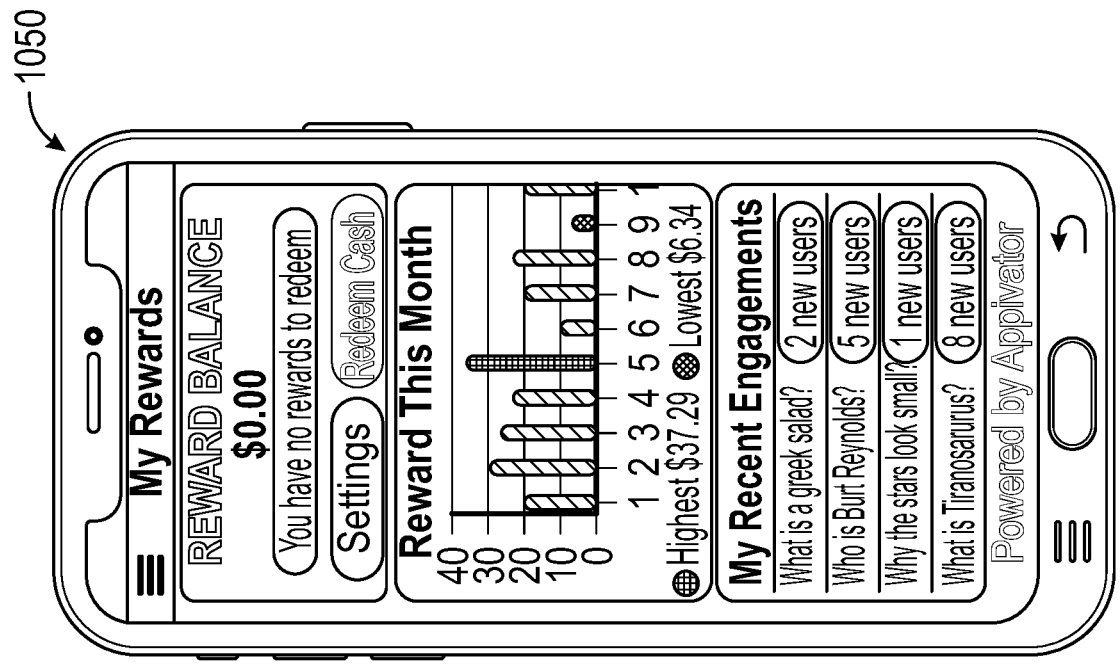
FIG. 10B illustrates the same user interface of FIG. 10A, after the user has selected the Redeem Cash button and initiated transfer of the redeemable incentives to an account of the user.
Figure 10A:
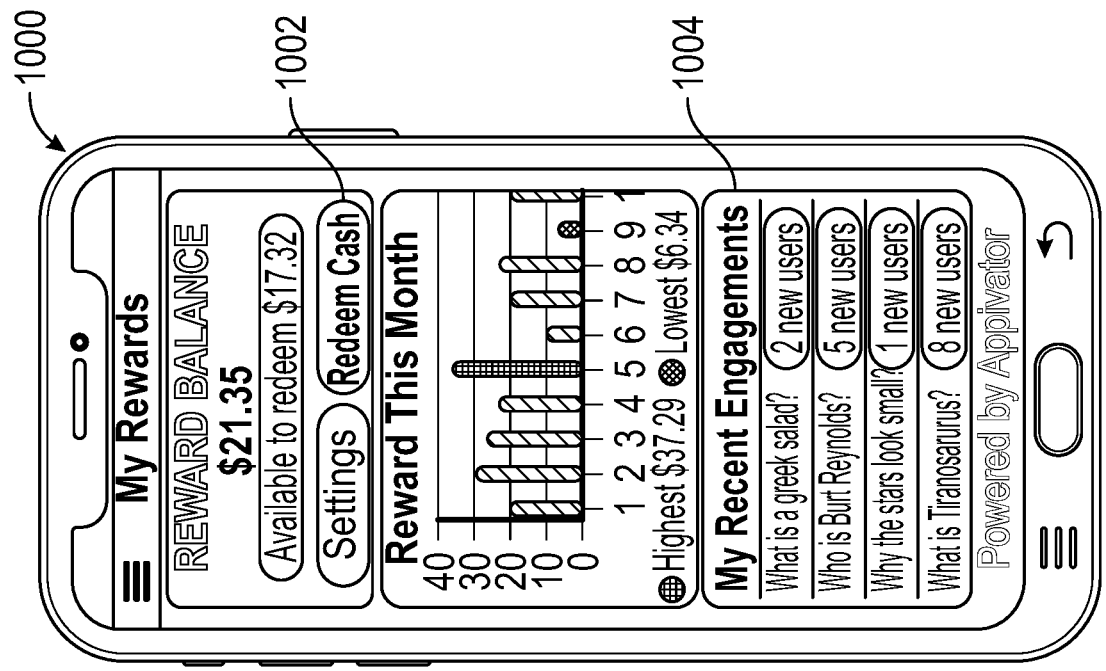
FIG. 10A illustrates another example of a user interface that may be provided to the user with information regarding the user's incentive account with the IMS, and an option to initiate payment of redeemable incentives to the user.

FIG. 10A illustrates another example of a user interface 1000 that may be provided to the user 90 with information regarding the user's incentive account with the IMS 70, and an option to initiate payment of redeemable incentives to the user 90 (e.g., by selecting the Redeem Cash button 1002). In this example, the user interfaces may be integrated into the software application of the provider 60, while in other implementations the user interfaces may be part of a separate software application, such as may be provided by the IMS 70. In the example of FIG. 10A, the user interface includes a recent engagements portion 1004 which generally highlight actions taken by the user that are associated with incentives. In this example, the incentivized actions are associated with responding to questions within the software application. FIG. 10B illustrates the same user interface 1050, after the user has selected the Redeem Cash button 1002 and initiated transfer of the redeemable incentives (e.g., $17.32 in this example) to an account of the user 90. Thus, in FIG. 10B, the rewards balance has been reduced to zero dollars.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computerized method, performed by a computing system having one or more hardware computer processors and one or more non-transitory computer readable storage device storing software instructions executable by the computing system to perform the computerized method comprising:
   receiving a request to provide an incentive management service to an application provider;
   receiving, from the application provider, selection of an activity associated with a software application provided by the application provider that may be performed by users of the software application;
   generating a webhook associated with the selected activity, wherein the webhook is configured to activate upon performance by a user of the software application of the selected activity associated with the software application;
   transmitting, via one or more networks, the webhook to the application provider for inclusion in the software application, wherein the software application is modified to include the webhook and the modified software application is distributed to a plurality of user devices, wherein activation of the webhook causes transmission of messages including at least respective user identifications;
   monitoring incoming network communications for the messages including respective user identifications initiated by the webhook;
   in response to identifying a message initiated by the webhook, determining:
      a user associated with a user identification included in the message;
      the activity associated with the webhook; and
      an incentive associated with the activity;
   storing, in a user database, information regarding the determined incentive in association with the user identification; and
   coordinating delivery of the incentive to the user.

2. The computerized method of claim 1, wherein performance of the activity in the software application is detected based on an update to a user record in a user record database of the application provider.

3. The computerized method of claim 2, wherein the messages initiated by the webhook are received from the application provider in response to an update to a user record in the user record database of the application provider.

4. The computerized method of claim 1, wherein the messages include at least a program identifier and an action identifier.

5. The computerized method of claim 1, further comprising:
   providing a developer portal configured to interface with the application provider, the developer portal configured to receive at least information regarding the activity.

6. The computerized method of claim 1, wherein the activity includes one or more of providing a referral, creating an event, uploading a picture, or saving an event.

7. The computerized method of claim 1, wherein the webhook integrated in the modified software application is configured to generate REST API posts in response to performance of the selected activity.

8. The computerized method of claim 7, wherein the REST API posts include an application programming interface (API) key and an API secret associated with the software application.

9. The computerized method of claim 1, wherein the messages generated by the webhook comprise REST API posts.

10. A computing system comprising:
a hardware computer processor;
a non-transitory computer readable medium having software instructions stored thereon, the software instructions executable by the hardware computer processor to cause the computing system to perform operations comprising:
receive a request for registration of a software application from a software developer;
assign at least an API key and an API secret to the software application, wherein the API key and API secret are unique to the software application;
provide, to the software developer, integration instructions including at least the API key and the API secret;
provide a developer platform to the software developer, the developer platform configured to receive program information including at least an action that may be performed by a user of the software application;
receive from the software developer, via the developer platform, a first action and a corresponding first incentive for performance of the first action;
monitor messages from an application server regarding performance of the first action by a user of the software application;
receive a first message from the application server indicating performance of the first action by the user;
updating a user database to include an indication of performance of the first action by the user and the corresponding first incentive;
periodically determine a cumulative incentive associated with the user, based on user information in the user database;
initiate transmission of the cumulative incentive to the user.

* * * * *